a = Refining Gas
b = Additives
c = Cooling Ingredients
d = Exhaust Gas Mixture in Converter
e = Heating Gas in Refining Apparates
f = Foamed Slag
g = Liquid Refining Jet

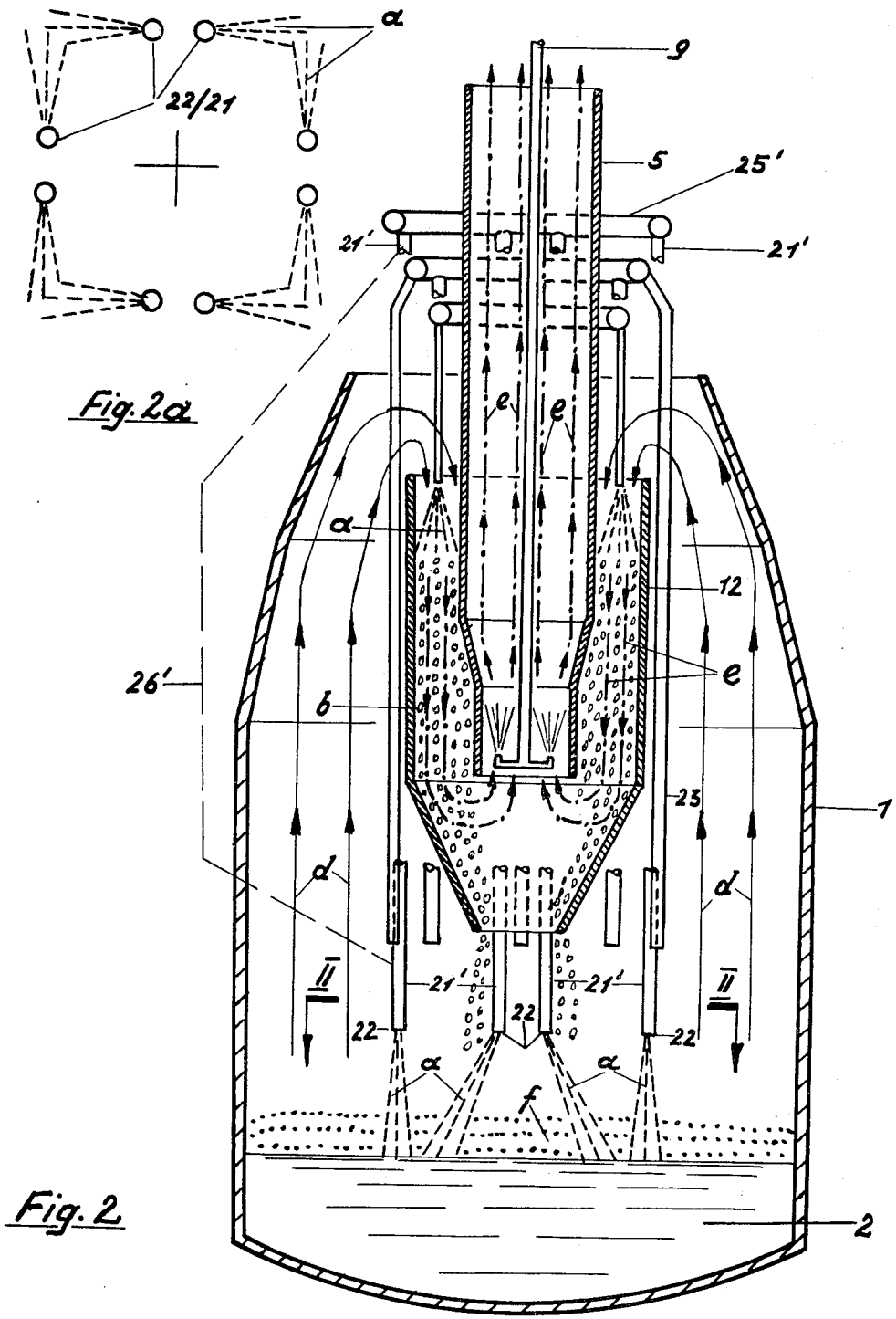

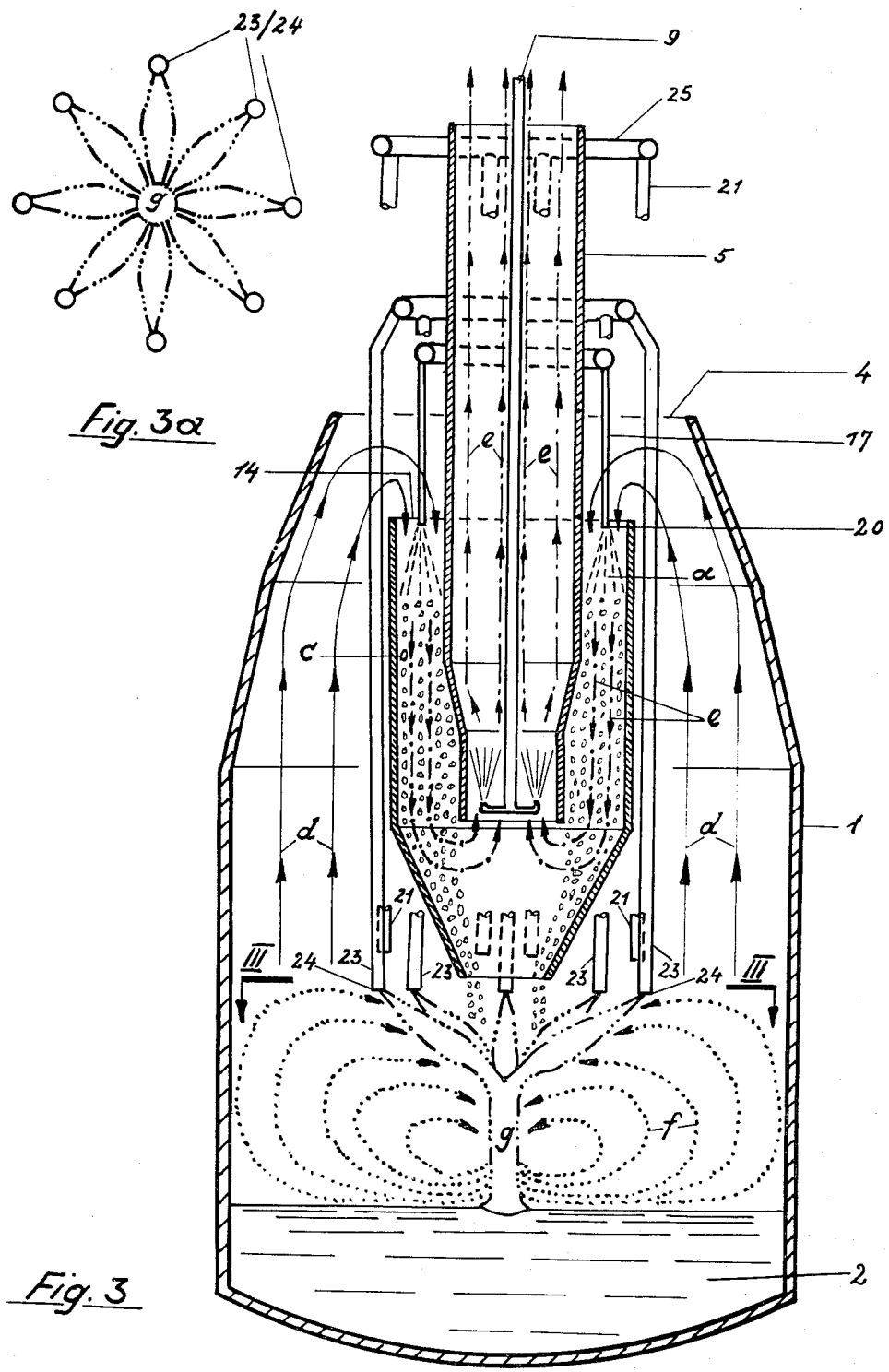

Fig. 5

United States Patent Office 3,684,488
Patented Aug. 15, 1972

---

3,684,488
METHOD OF REFINING MOLTEN METAL
Walter von Haumeder, 6 Mozartstrasse,
D-43 Essen (Ruhr), Germany
Filed Mar. 5, 1970, Ser. No. 16,684
Int. Cl. C21c 5/28
U.S. Cl. 75—52                          11 Claims

ABSTRACT OF THE DISCLOSURE

Molten metal, particularly pig iron, is refined by oxygen supplied to the melt substantially in the form of liquid metal oxides. Refining gas, preferably high purity oxygen, blown above the melt surface entrains slag and pulverulent additives to form a refining jet in which a substantial part of the oxygen reacts to form liquid metal oxides which refine the melt under controlled endothermal conditions. A foamed slag is prepared during the first phase of the refining operation by blowing refining gas above the surface of the melt while injecting powdered lime in a stream of refining gas into and through a combustion chamber located above the slag surface, in which the heat liberated by reaction of the exhaust gases drawn in from the converter is absorbed by the lime particles traveling through the chamber on their way to the slag. During the second phase of the process pulverulent cooling additives such as sponge iron are added in the same manner.

BACKGROUND OF THE INVENTION

This invention relates to a new pneumatic process and apparatus for refining metals, particularly molten pig iron and mixtures of molten pig iron and scrape iron, with an oxygen-containing refining gas, preferably high purity oxygen. According to the invention, the impurities contained in the metal charge are oxidized by liquid metal oxides supplied to the melt by means of a refining jet formed by refining gas blown above the surface of the melt which entains slag, pulverulent additives, exhaust gases and cooling constituents from above the melt surface to form a refining jet in which a substantial portion of the gaseous oxygen is reacted to produce liquid metal oxides which refine the melt by oxidizing the impurities contained therein under controlled endothermal conditions at a tempearture substantially lower than the temperatures of present pneumatic methods. The major portion of the exothermal reactions occur outside the melt and the heat energy liberated is used to heat the slag, metal bath and slag forming and cooling constituents. The invention also provides a process and apparatus for utilizing the thermic potential of the carbon monoxide which emanates from the bath as a result of the decarbonization reaction to pre-heat the additives in a confined combustion region above the bath surface.

In the original Bessemer process, the first pneumatic system for steelmaking, steel was produced by blowing air into molten metal charges through tuyeres located in the bottom of the converter. This process had a limited use for the reason that it utilized an acid refractory lining and consequently could only be used to refine pig iron with a very low phosphorus content. It was soon followed by the Thomas pneumatic process which utilized basic refractory linings which permitted the utilization of basic slags for binding the oxidized phosphorus and sulfur impurities. These processes were unsatisfactory due to the high nitrogen content of the steel produced.

The advantages of refining steel with high purity oxygen, notably reduced nitrogen content, have long been known and intensive experimentation aimed at devising methods for refining steel with high purity oxygen in place of air have been conducted by steelmakers for over thirty years. The earliest attempt to refine steel with high purity oxygen by blowing high purity oxygen through the bottom tuyeres of the Bessemer and Thomas converters were unsuccessful for the reason that the extremely high temperatures developed in the bottom of the converter quickly choked the tuyeres and rapidly destroyed the refractory linings. Extensive experimentation then followed with processes utilizing oxygen jets blown downwardly at various angles from above the melt surface onto and into the bath. All prior attempts to refine metals by pneumatic methods have been based on blowing air, high purity oxygen and oxygen-containing refining gases onto and into molten metal charges to effect removal of the oxidizable impurities through direct oxidation of such impurities by gaseous oxygen.

In the present methods for refining melts with high purity oxygen, oxygen is blown downwardly into the melt in the form of a free blast of high density and kinetic energy. The free oxygen blast mixes with the surrounding gases and slag and assumes a conical shape. The expansion of the cross section of the cone is limited by the conditions necessary for proper mixing and penetration and its included angle usually does not exceed 8–10°. The velocity of the blast progressively decreases from the cone center, the point of maximum velocity, to the cone periphery. The amount of furnace exhaust gases and slag drawn in by the blast is proportional to the length of the blast path and the amount of oxygen discharged by the nozzles and can be varied only within fairly narrow limits.

Since the metal in the impact zone can absorb only small portions of the gaseous oxygen supplied by the blast, and the oxygen is incapable of penetrating very far into the melt, the oxygen displaces liquid metal from this portion of the melt surface and forms a crater which causes the major part of the oxygen blast to be deflected to form a secondary blast. The resulting friction and suction causes molten metal to be sprayed from the melt and thrown against the wall of the converter vessel, where the sprayed metal droplets react with the gaseous oxygen of the secondary blast. Consequently, in this type of process only a small portion of the metal is refined in the impact zone, the major part of the metal being refined above the melt. The melt must also have a certain minimum depth because of the crater formed in the reaction spot on the surface. The high reaction temperature at the impact zone (2500–3200° C.) and the continuous spraying of the slag with falling refined metal droplets result in poor desulfurization. To achieve spraying in such systems a minimum constant pressure in the core of the oxygen blast and a definite spacing of the nozzles from the melt are required.

In top blowing methods as exemplified in U.S. Pat. No. 2,800,631 relatively low static pressure oxygen blasts are blown vertically, from one or more nozzles, onto the center of the melt from a lance hung above the melt surface. A minimum constant oxygen blast pressure and distance between the lance and the melt is required to achieve a certain depth of oxygen penetration of the melt, in order to react the oxygen gas with the impure molten metal in a localized reaction zone in the center of the melt and to produce an early slag capable of binding the dephosphorization reaction products.

In the foregoing systems, metal is refined by direct oxidation of the impurities, carbon, silicon, phosphorus, manganese and sulfur, with gaseous oxygen in localized reaction zones of the bath and above the melt surface. Direct localized contact between free oxygen and molten metal and poor heat conduction caused by insufficient agitation of the bath adjacent the stationary impact zone of the melt, in which direct reaction between oxygen and the metal bath produces temperatures in the range of 2500–3200° C., causes evaporation of metal from the bath which is exhausted from the converter, thus causing excessive loss of metal as well as pollution and dust removal problems. The spraying of metal droplets by the deflected oxygen blasts results in additional appreciable metal losses, as the droplets are partially carried into the exhaust gases by the upstream of carbon monoxide and dioxide. Also, the impact of the oxygen blast causes the slag forming and cooling constituents floating on the surface of the melt to be displaced from the reaction zone, thus rendering it impossible to maintain controlled endothermal reactions in that area of the melt and frequently the slag wave edge is so high that slag falls into the center of the jet, which results in large particles of metal and slag being thrown out from the bath. Additionally, since the impurities are directly oxidized by oxygen gas, the progress of the reactions by direct oxidation is controlled by the affinity of the impurities for oxygen and can be varied or controlled only within very narrow limits. Another drawback of present top blowing systems is that the ratio between the surface as a whole and the impingement reaction zone (approximately 36:1) results in a very slow rotation of the melt.

Phosphorus removal in present top blowing systems is dependent upon the formation of an early fluid slag rich in metal oxides, such as ferrous oxide, which, in turn, is dependent, to a large extent, upon rapid dissolution of the lime additive and the depth of penetration of the oxygen jet into the metal. For the production of steel of low phosphorus content (below 0.03%) it is necessary to carefully regulate the static pressure in the core of the oxygen blast and the distance between the lance nozzle and the surface to provide enough surface oxidation to form a sufficient level of ferrous oxide for the dephosphorization reaction. It has long been recognized that the addition of lime, in powdered or granulated form will, in the presence of sufficient ferrous oxide, rapidly produce a fluid slag capable of absorbing the dephosphorizing reaction products but none of the methods heretofore proposed for introducing pulverulent additives has proved practical in commercial operation.

Perhaps the most serious drawbacks of all top blowing processes are the pollution and dust removal problems caused by the high temperatures in the impact zone and the combustion of carbon monoxide which results in very high exhaust gas temperatures (1300–1800° C.) and direct oxidation of the metal by gaseous oxygen in the localized reaction zone which results in the formation of large quantities of dust-laden fumes of metal oxides, particularly ferric oxide, which are exhausted from the converter. To prevent air pollution, these metal oxide fumes must be removed from the exhaust gases. This is conventionally done by first passing the dust-laden fumes through a gas cooling system in order to cool the gas to a temperature of approximately 150–180° C. before it can be handled by the dust cleaning plant. After the fumes are sufficiently cooled they are then passed through the dust cleaning system in which the dust is removed by electrostatic precipitators or wet scrubbers.

In top blowing systems, such as described in U.S. Pat. No. 2,800,631, the carbon monoxide emanating from the bath as a result of the decarbonization reaction is exhausted from the converter, the combustion of carbon monoxide to carbon doxide above the melt surface being avoided to prevent further increase in the high temperatures inside the converter causing melting of the refractory lining. Thus, a considerable portion of the potential heat units is not realized in such processes. Various means have been proposed, without success, for utilizing the potential heat units of the carbon monoxide of the converter exhaust gases, including rotation of the melt and the injection of a free stream of additive-containing oxidizing gases from above the melt surface. The latter proposal is not practical because combustion and heat transfer are not adequately controlled and the additives are scattered and blown out of the converter with the exhaust gases.

SUMMARY OF THE INVENTION

The present invention relates to a pneumatic method and apparatus for refining molten metal charges, particularly molten pig iron charges and mixtures of molten pig iron and scrap iron, by removing the oxidizable impurities contained therein by oxidation reactions substantially conducted, under controlled endothermal conditions, by means of liquid metal oxides, supplied to the melt by a refining jet.

This is accomplished and the refining jet is formed by introducing submerged jets of refining gas beneath the slag above the melt surface in a flow pattern which, by means of their kinetic energy, entrain slag, exhaust gases and cooling constituents above the melt to form a liquid jet stream in which the oxygen gas is converted to liquid metal oxides, ferrous oxide in steelmaking, which jet stream is directed over substantially the entire surface of the molten metal bath to refine the metal. The exothermal reactions are thus substantially conducted above the bath, and the oxidation reactions mainly proceed between the oxidizable impurities and the oxidizing liquid metal oxides contained in the refining jet.

A foamed slag to meet the requirements of the process may be developed during the first slag forming phase of the refining process in a number of ways, e.g., top blowing with oxygen or a gas of lesser oxidizing power with the addition of hot lime to beat up a foamed slag during the first stage of the steelmaking operation. When all of the additives necessary for binding the impurities have been introduced the foamed slag forming phase of the process is terminated. Submerged refining jets are then discharged into the slag simultaneously with the addition of cooling ingredients from above the melt, thus forming a liquid refining jet of refining gas entrained slag, exhaust gases and cooling additives, which react from above the melt to produce liquid metal oxides, which is directed over the melt to refine the metal.

The foamed slag is preferably prepared by means of a separate set of gas jets which discharge an oxygen-containing gas, preferably high purity oxygen, onto and over the surface of the metal bath at an angle of more than 20° operated simultaneously with addition of impurity binding additives, to beat up a foamed slag. These foamed slag forming jets are desirably movable between a lower position between the discharge nozzles of the refining jets employed during the second phase of the process and the melt surface and an upper position above the said discharge nozzles so as to permit them to be submerged by and then elevated with the progressively rising foamed slag to a position above the level of the discharge nozzles of the refining gas jets.

Another feature of this invention is the use of a combustion chamber positioned in the converter above the surface of the melt on the longitudinal axis of the converter into which oxidizing gas, preferably high purity oxygen, carrying particulate additives is injected, thereby creating an injection pump effect which draws exhaust gases rich in carbon monoxide from the converter into said combustion chamber in which the oxidizing gas oxidizes the carbon monoxide to liberate heat energy, at least a portion of which is absorbed by the particulate additives traveling downward through the chamber into the converter. During the first phase of the refining operation, the additive is a binding additive such as lime, but may be any other material capable of binding the various substances formed by oxidation of the impurities contained in the melt. In the second phase, the additives are cooling ingredients, such as sponge iron and/or iron oxide. Preferably, said additives are added in the form of granules having a diameter which does not exceed 5 millimeters. The cooled heating gas, principally carbon dioxide, is exhausted from the converter. This embodiment of the invention utilizes the thermic potential of the carbon monoxide liberated by the decarbonization reaction which, in present top blowing systems, is exhausted from the converter, and also makes it possible to utilize powdered or granulated sponge iron and ferric oxide as a cheap source of ferrous oxide for oxidizing the impurities and to provide additional metal for the bath.

This invention overcomes several serious drawbacks of present top blowing refining methods, notably the production of undesirable quantities of metal oxide, e.g., ferric oxide dust-laden fumes and poor dephosphorization and desulfurization.

As noted above, huge quantities of extremely hot dust-laden fumes are exhausted from the converter as a result of direct oxidation of the metal by oxygen gas in highly localized reaction zones, which results in loss of metal from the bath and requires expensive cooling and dust separating equipment to reduce air pollution. In the process according to this invention, suppression of direct oxidation of the metal by gaseous oxygen significantly reduces evaporation of metal from the bath. The utilization of the carbon monoxide contained in the exhaust gases to preheat the additives as well as the slag and melt and the controlled endothermal conditions which prevail during the refining reactions also result in a substantial reduction in the temperature of the gas which is exhausted from the converter. To the extent that metal vapors and metal oxides are formed a substantial fraction of the same are absorbed by the preheated additives passing through the combustion chamber and thereby returned to the bath.

The instant process insures the formation of an early fluid slag which contains a high concentration of oxidizing metal oxides, such as ferric oxide, which results in a more efficient absorption of the dephosphorization reaction products. The lower operating temperature and the high content of iron oxides in the slag also increase the efficiency of the desulfurization reaction.

The oxidation refining reactions which occur during the refining process according to this invention, take place between the oxidizable impurities and metal oxides, such as ferrous oxide supplied by the refining jet over substantially the entire surface of the melt under controlled endothermal conditions and at temperatures substantially lower than present top blowing systems. The high concentration of liquid metal oxides in the refining jet also serves to oxidize carbon monoxide which bubbles out of the melt through the slag to liberate additional heat for the slag.

DETAILED DESCRIPTION OF THE DRAWINGS

FIG. 2 is a vertical transverse sectional view of a converter fitted with one embodiment of the refining apparatus which illustrates the operation of the apparatus during the first stage of the process;

FIG. 2 is a horizontal cross-section taken on lines II—II of FIG. 2 which illustrates the operation of the priming nozzles during the first stage of the process;

FIG. 3 is a vertical transverse sectional view of the converter vessel and refining apparatus which illustrates the operation of the refining apparatus during the second stage of the process;

FIG. 3a is a horizontal cross-section taken on lines III—III of FIG. 3 which illustrates the operation of the refining gas nozzles during the second stage of the process;

FIG. 5 is a legend defining the symbols used in FIGS. 2, 2a, 3 and 3a for various substances and their flow paths.

DETAILED DESCRIPTION OF THE PREFERRED EMBODIMENTS

Figures 1, 1A:
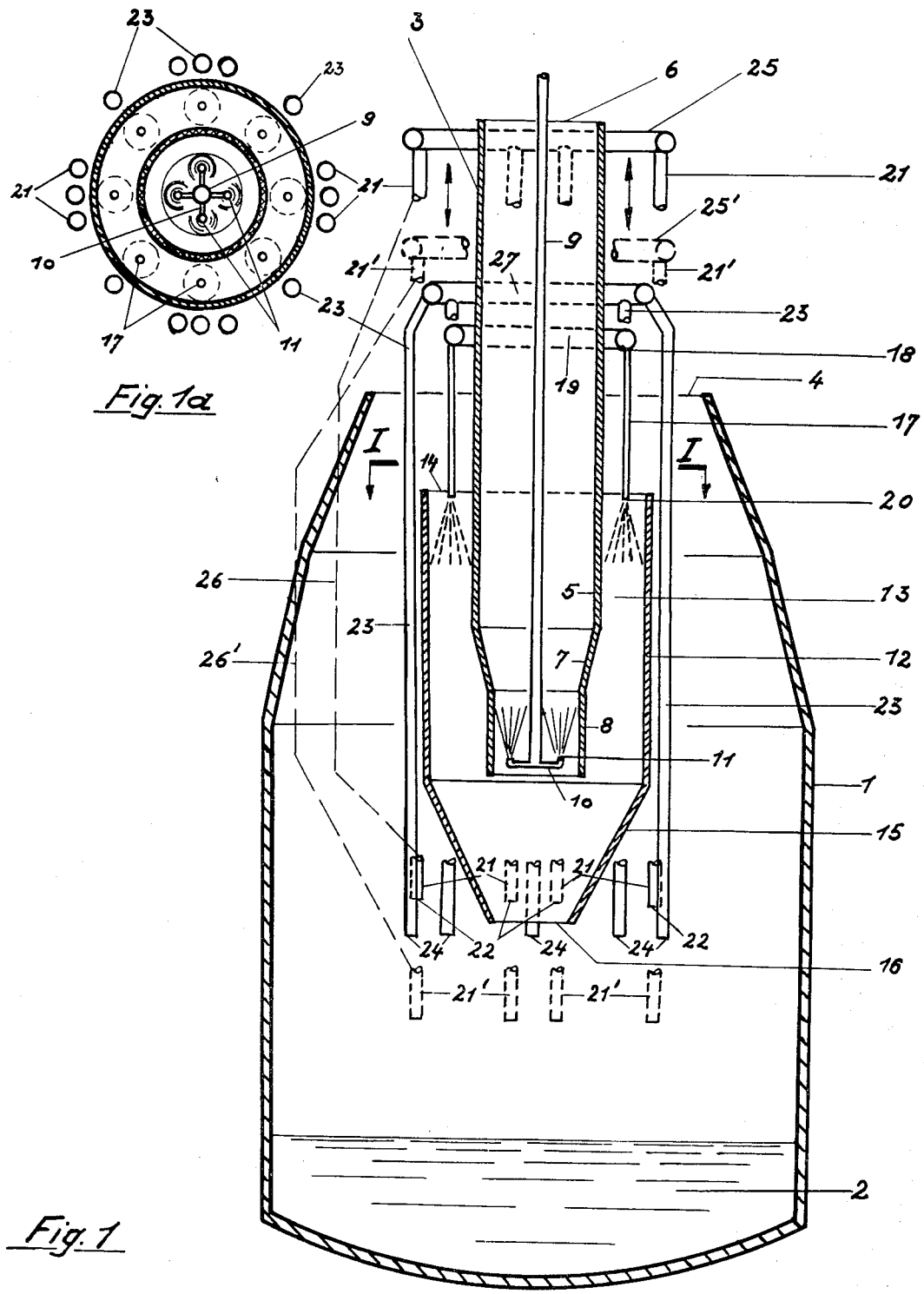
FIG. 1 is a vertical transverse sectional view of a converter fitted with one embodiment of the refining apparatus.
FIG. 1a is a horizontal cross-section taken on lines I—I of FIG. 1.

Referring to FIG. 1 which shows one embodiment of the refining apparatus of the invention, converter vessel 1 is a conventional converter-type vessel containing a molten metal charge 2, such as molten pig iron and mixtures of molten pig iron and melted scrap. Retractably overhung refining apparatus 3 is inserted into the converter through mouth 4 and centrally positioned over material charge 2. Refining apparatus 3 carries an inner gas exhaust cylinder 5 having an upper discharge portion 6 which extends above mouth 4 of converter vessel 1, a conical transition portion 7 and a lower entrance portion 8. An air pipe 9 connected at its upper end to an air supply conduit above the converter is mounted in the axis of inner cylinder 5, and has a bottom end provided with radially projecting delivery arms 10 fitted with upwardly facing nozzles 11 positioned within lower entrance portion 8 of cylinder 5.

An outer cylindrical heating chamber 12 having an annular heating space 13, a top annular passageway 14, a slightly conical bottom end portion 15 and a discharge passageway 16 is coaxially disposed around inner cylinder 5 and positioned entirely within converter vessel 1. Its conical bottom portion 15 extends further down into converter vessel 1 than the lower entrance 8 of inner cylinder 5.

Mounted concentrically around inner cylinder 5 are gas propelling pipes 17 connected at their intake end 18 to an annular gas supply conduit 19 and fitted, at their discharge end with delivery nozzles 20.

One set of gas priming pipes 21 provided with delivery nozzles 22 and one set of refining pipes 23 provided with delivery nozzles 24 are mounted circularly around outer cylinder 12. FIG. 1 shows the arrangement of eight priming pipes 21 and eight refining pipes 23. Gas priming pipes 21, are connected to annular central supply conduit 25 with which they are movably mounted to permit their regulated movement in an up and down direction from a lower end position between nozzles 24 of gas refining pipes 23 and the surface of the metal bath 2 and an upper position above the nozzles 24 of gas refining pipes 23. FIG. 1 diagrammatically illustrates four priming pipes 21 in an upper and lower end position, the others being hidden from view by other elements of the refining apparatus. In the upper position, the central connecting section, joining the top and bottom sections of pipes 21, hidden from view by other elements of the apparatus, is represented by broken line 26. FIG. 1 also illustrates the location of the annular supply conduit 25' and the top and bottom sections of priming pipes 21' in a lower end position, the central connecting section, hidden from view by other elements of the apparatus, being represented by broken line 26'.

FIG. 1 also diagrammatically illustrates the location of five of the eight refining pipes 23 shown in FIG. 1a, connected to annular supply conduit 27, the others being hidden by other elements of the apparatus Inner cylinder 5, air pipe 9, outer cylinder 12, propelling gas pipes 17 and refining gas pipes 23 are all mounted together as a rigid unit.

The parts described above are designed in such a manner so that when propelling gas is discharged through pipes 17 into chamber 12, an ejector pump effect is obtained whereby gases from the outer parts of chamber 12 within converter vessel 1 are drawn through annular passage 14 into annular heating space 13 of outer cylinder 12 and forced downwards.

During the refining process carried out using the foregoing refining apparatus, a refining gas is supplied through priming gas pipes 21 or refining gas pipes 23. The refining gas may comprise, in addition to technically pure oxygen, carbon monoxide, carbon dioxide, hydrocarbons, air, methane, natural gas, steam, etc., as well as mixtures thereof, with or without the addition of oxygen.

In the operation of the refining apparatus during the first phase of the refining process, as illustrated in FIG. 2, refining gas is discharged through delivery nozzles 22 of priming pipes 21' in their lower end position as shown in FIG. 2. FIG. 2a shows a preferred flow pattern of refining gases issuing from the delivery nozzles 22 of priming pipes 21.

Through delivery nozzles 20 of propelling gas pipes 17, jets of refining gas $a$ carrying suspended pulverulent additives $b$, preferably lime are injected into the upper portion of chamber 12, thereby creating an injector pump effect which draws converter exhaust gas $d$ containing carbon monoxide, carbon dioxide and iron vapors into annular heating space 13. Refining gas $a$ and exhaust gas $d$ are combusted therein to form a heating gas $e$ which exchanges heat with additives $b$ traveling through the chamber toward the bath.

The pre-heated additives continue to fall downward toward the melt through conical section 15 of outer cylinder 12, while heating gas $e$, which is cooled by heat exchange with additives $b$, is deflected upwards by the propelling gas issuing from discharge nozzles 11 of air pipe 9 and exhausted from the converter through inner exhaust cylinder 5.

The pre-heated pulverulent additives $b$, especially lime are entrained by the refining gas issuing from delivery nozzles 22 and liquidified, whereby mainly lime ferrites are produced. The mixture of refining gas $a$ and exhaust gas $d$ simultaneously very rapidly beats up the slag into a slag foam $f$ which progressively rises, in converter 1, very fast and quietly without ejection or sputtering until it reaches delivery nozzles 22. The time at which this occurs can be determined by well-known acoustical techniques.

By further supply of additives $b$ through gas priming pipes 21 the foamed slag $f$ continues to rise in converter 1 above delivery nozzles 22. The submerged delivery nozzles 22 of priming pipes 21 are then progressively raised from their lower end position to their upper position as the foam slag continues to rise. The refining gas jets issuing from submerged delivery nozzles 22 now entrain principally foamed slag, in which the portion of gaseous oxygen rapidly decreases. Before the end of the first phase of the process, the portion of free oxygen in the refining gas jets amounts to about 25% or less. This signifies that less exothermal reactions and more endothermal reactions occur at the surface of the melt. When all additives $b$ required for binding the impurities contained in the pig iron charge 2 have been introduced into converter vessel 1 and liquified, the first phase of the process is terminated.

In the second phase of the refining process, which is illustrated in FIG. 3, cooling ingredients $c$ such as iron ore or sponge iron, preferably in granules of less than 5 millimeters, are introduced in a stream of refining gas through delivery nozzles 20 of propelling gas pipes 17, instead of additives $b$, into annular heating space 13, where they absorb the heat liberated by the combustion of exhaust gas $d$ with refining gas $a$ and the cooled heating gas $e$ is exhausted from the converter. At the beginning of the second phase of the process, refining gas $a$ is switched over from priming pipes 21 to refining gas pipes 23. Delivery nozzles 24 of refining gas pipes 23 are aimed towards a point above the melt surface on the axis of convert 1. A preferred flow pattern of refining gas issuing from delivery nozzles 24 is shown in FIG. 3a.

The pre-heated cooling ingredients $c$ emerging from annular heating space 13 are entrained by the jets of refining gas $a$ issuing from delivery nozzles 24 and stirred with foam slag $f$, thereby producing a liquid refining jet $g$, in which the slag is directly oxidized to liberate heat which serves for cracking and melting the cooling ingredients $c$.

The major portion of the refining jet $g$ is comprised of liquid ingredients and contains approximately 8% or less of gaseous materials from the exhaust gas mixture $d$, which mainly contains carbon monoxide and carbon dioxide. In addition to the slag $f$, the refining jet $g$ also contains ferrous oxide (FEO) and ferric oxide ($Fe_2O_3$), and may also contain elemental iron (Fe), depending on the choice of the cooling ingredient.

The temperature in the refining jet $g$ is usually below 2000° C. The decarbonizing reaction and all other oxidation reactions involving the impurities contained in the molten metal charge are substantially conducted, in the melt, with ferrous oxide (FeO). The oxidation of carbon by ferrous oxide in the melt 2, liberates carbon monoxide which produces violent agitation in the melt and which bubbles up from the melt and blows up the foamed slag passing over the surface of the melt. The high oxidative power of the refining jet causes a portion of the carbon monoxide emanating from the melt to be oxidized to carbon dioxide, thereby producing additional heat which serves to heat the melt 2 and the foamed slag $f$.

Figures 4, 4A:
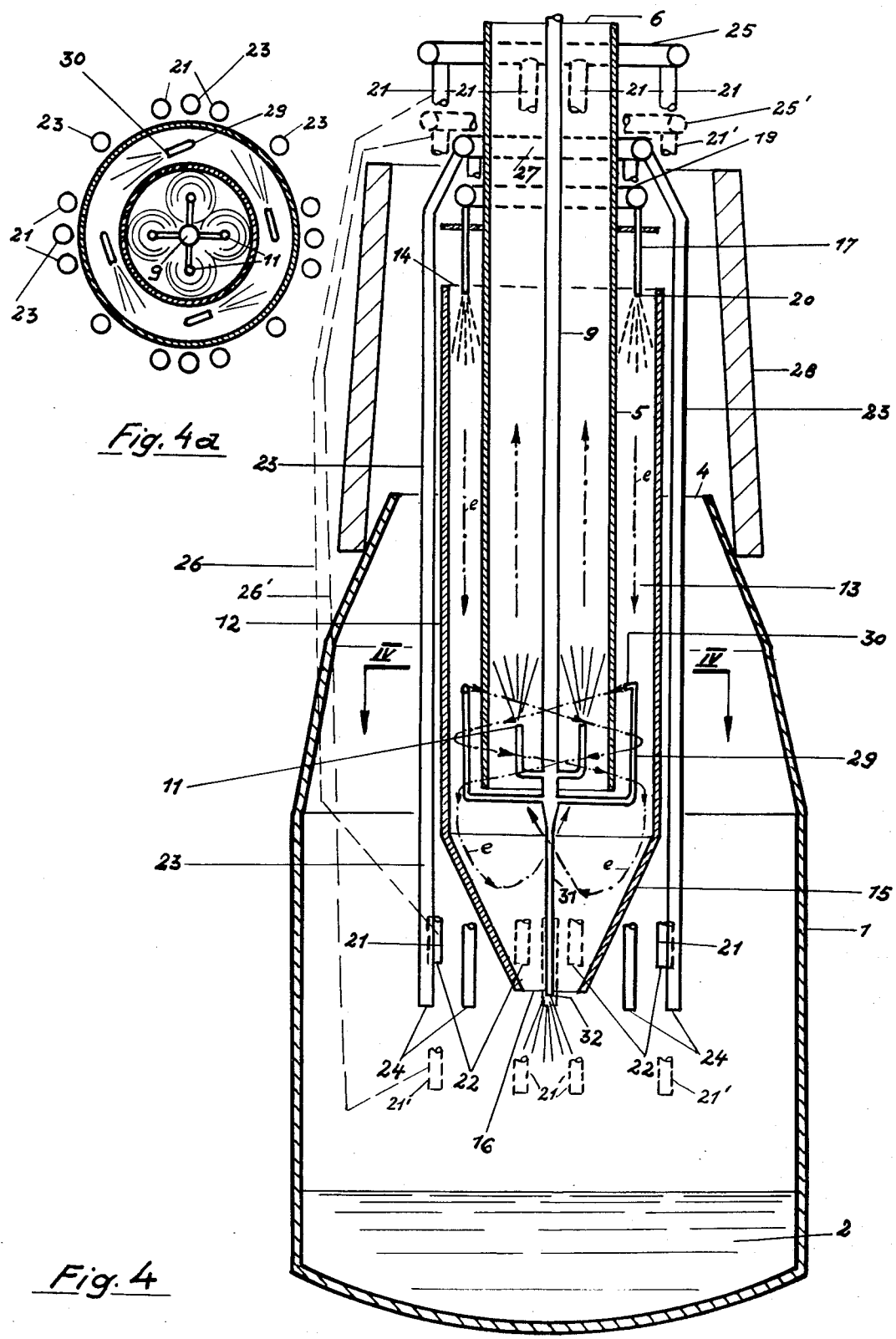
FIG. 4 is a vertical transverse sectional view of a converter vessel fitted with a second embodiment of the refining apparatus.
FIG. 4a is a horizontal cross-section taken on lines IV—IV of FIG. 4.

Another embodiment of a refining apparatus illustrated in FIG. 4, extends further above the converter vessel 1 than the apparatus shown in FIG. 2, and is provided with a hood 28 which can be raised and lowered, to close the mouth 4 of the converter vessel 1. In operation exhaust gas mixture $d$ is drawn into annular heating space 13 through annular passage 14 which is located at a level above converter mouth 4. A set of radial gas delivery arms 29 fitted with delivery nozzles 30 radially extend from propelling pipe 9 along the wall of inner cylinder 5 into the lower portion of annular heating space 13. The jets of gas issuing from nozzles 30 causes a rotation of heating gas $e$ loaded with additives $b$ or cooling ingredients $c$, whereby a cyclone effect is produced which separates the heating gas $e$ from the solid particles. A preferred flow pattern of the gas issuing from delivery nozzles 30 is shown in FIG. 4a. An air pipe 31 extends air pipe 9 in the conical bottom end portion 15 with delivery nozzle 32 at the level of the discharge passageway 16. The air jet issuing from delivery nozzle 32 draws additives $b$ or cooling ingredients $c$ and exhaust gas $d$. The combustion of the hot exhaust gas $d$ with the air prevents cooling of the additives $b$ or cooling ingredients $c$ which otherwise could occur due to adiabatic expansion of the air. This air jet further forces the additives $b$ or cooling ingredients $c$ vertically downwards. Finally the air jet entrains exhaust gas $d$ from the discharge passageway 16, thus eliminating the flow of exhaust gas $d$ into the conical bottom end portion 15. The operation of this embodiment is otherwise substantially the same as that of the embodiment described above.

The process of this invention is equally applicable to pig iron having analysis of the type normally refined in either the open hearth, Bessemer or Thomas processes, as well as mixtures of such pig iron and scrap additions.

The following is a description of a practical example of a complete specific embodiment of the process to illustrate the method of this invention using the refining apparatus depicted in FIG. 1. The refining apparatus contains eight gas priming pipes 21 and eight refining gas pipes and is mounted in a 35 ton converter of conventional design with an inner height of 6.5 meters, an inner diameter of 3.0 meters and a mouth diameter of 1.8 meters. This run was carried out and the refining apparatus operated in the manner described above, with additional covering lime being added with refining gas blown through the priming nozzles following the completion of the process.

Materials per charge:
    Pig iron—29,700 kg.
    Sponge iron—15.350 kg.[1]
    Lime—2,100 kg.[1]
    Refining oxygen in the apparatus—1,240 Nm.$^3$
    Through refining gas pipes—1,814 Nm.$^3$
    Refractory consumption—130 kg.
    Covering lime—500 kg.[1]

[1] Granule diameter 0.1 mm.

*Analyses.*—Pig iron: 4.4% C, 1.02% Si, 1.56% Mn, 0.12% P, 0.025% S. Sponge iron: rate of reduction, 90%.

|  | Percent |
|---|---|
| Fe (metal) | 85.000 |
| FeO | 12.200 |
| Gangue | 2.800 |

Gangue, comprising:

|  |  |
|---|---|
| $SiO_2$ | 0.870 |
| CaO | 0.550 |
| MgO | 0.660 |
| P | 0.160 |
| S | 0.007 |
| $Al_2O_3$ | 0.553 |

Steel obtained, soft quality: 0.06% C, 0.35% Mn, 0.014% P, 0.016% S. 0.0% Si.

In Table I, the total oxygen supplied, the number, smallest nozzle diameter and distance of the priming gas nozzles and the refining gas nozzles from the melt surface, quantities of materials aspirated into the refining jets, and amounts of lime and sponge iron supplied are given on a timetable basis during certain phases of the operation of the process. Also recorded in Table I on a timetable basis, are the heat quantities in and the total weight of the refining jet and the temperature of the slag. Table II gives the quantity of oxygen as propelling gas *a* supplied, the quantities, and analyses of aspirated exhaust gas *d*, the total heat in heating gas *e*, the quantities and heat content of additives *b* and *c* and the volume, and analyses of, heating gas *e* after combustion on a timetable basis during the operation of the process.

TABLE I.—REFINING JET DATA

| Phase | Refining time, minutes | Refining pipes | | | | Distance refining gas pipe to melt, mm. | Quantities aspirated into the refining jets | | | | Heat quantities in refining jet | | | Slag temperature, °C. |
|---|---|---|---|---|---|---|---|---|---|---|---|---|---|---|
| | | Refining gas $O_2$, Nm.$^3$/min. | Number | $O_2$, Nm.$^3$ per nozzle/min. | Smallest nozzle diameter, mm. | | Exhaust gas, Nm.$^3$/min. | Slag, kg./min. | Lime, kg./min. | Sponge Iron, kg./min. | Combustion heat, Kcal./min. | Total heat, Kcal./min. | Total weight, kg./min. | |
| I. Phase igniting gas pipes | 0–1 | 120 | 8 | 15 | 15 | 600 | | | 156 | | 15,553 | 79,333 | 334 | |
| | 2–3 | 120 | 8 | 15 | 15 | 750 | 5.15 | | 286 | | 60,400 | 184,000 | 482 | |
| | 4–5 | 120 | 8 | 15 | 15 | 1,050/1,400 | 20.0 | 14,064 | 540 | | 700,000 | 7,160,000 | 14,772 | |
| II. Phase refining gas pipes | 5–6 | 57.6 | 8 | 7.2 | 9.4 | 1,400 | | 9,000 | | 700 | 340,000 | 4,655,100 | 9,882 | 1,650 |
| | 11–12 | 57.6 | 8 | 7.2 | 9.4 | 1,400 | | 9,000 | | 1,000 | 340,000 | 4,890,500 | 10,082 | 1,660 |
| | 14–15 | 57.6 | 8 | 7.2 | 9.4 | 1,400 | | 9,000 | | 950 | 340,000 | 4,888,200 | 10,032 | 1,660 |
| | 18–19 | 57.6 | 8 | 7.2 | 9.4 | 1,400 | | | | 780 | 340,000 | 4,886,400 | 9,782 | 1,660 |
| | 24–25 | 120 | 6 | 20 | 15 | 900 | 22.8 | | 325 | | 68,856 | 188,656 | 527 | |

TABLE II.—REFINING APPARATUS OPERATION

| Refining time, minutes | Propelling gas $O_2$, Nm.³/min. | Aspirated exhaust gas, d | | | Total heat in heating gas e, Kcal./min. | Additive b, lime | | Coolant c, sponge iron | | Heating gas e, after combustion | | |
|---|---|---|---|---|---|---|---|---|---|---|---|---|
| | | Volume, Nm.³/min. | CO, Nm.³/min. | $CO_2$, Nm.³/min. | | Kg./min. | Heat content at 1,300° C., Kcal./min. | Kg./min. | Heat content at 1,300° C., Kcal./min. | Volume, Nm.³/min. | $CO_2$, Nm.³/min. | $O_2$, Nm.³/min. |
| 0-1 | 30 | 50 | 45 | 5 | 155,300 | 240 | 102,250 | | | 57.5 | 50 | 7.5 |
| 2-3 | 50 | 100 | 80 | 20 | 287,700 | 440 | 184,700 | | | 110 | 100 | 10 |
| 4-5 | 60 | 110 | 95.6 | 11.4 | 341,600 | 540 | 227,700 | | | 122.2 | 110 | 12.2 |
| 5-6 | 40 | 70 | 63.5 | 6.5 | 225,400 | | | 700 | 152,750 | 78.25 | 70 | 8.25 |
| 11-12 | 55 | 100 | 90 | 10 | 325,500 | | | 1,000 | 222,500 | 78.5 | 70 | 8.5 |
| 14-15 | 50 | 90 | 82 | 8 | 297,700 | | | 950 | 211,370 | 99 | 90 | 9 |
| 18-19 | 40 | 75 | 69 | 6 | 249,750 | | | 780 | 173,500 | 81.5 | 75 | 6.5 |
| 24-25 | 50 | 90 | 72 | 18 | 267,940 | 500 | 174,400 | | | 104 | 90 | 14 |

The following are analyses of a sample of the melt and slag after five minutes and at the end of the process:

| | After 5 minutes | At end of process |
|---|---|---|
| Melt: | | |
| C | 3.5 | 0.06 |
| Si | 0.0 | 0.0 |
| Mn | 0.40 | 0.35 |
| P | 0.068 | 0.104 |
| S | 0.028 | 0.016 |
| Temp., °C | 1,600 | 1,650 |
| Slag: | | |
| FeO | 10.8 | 11.8 |
| $Fe_2O_3$ | 2.7 | 7.6 |
| MnO | 11.2 | 7.7 |
| CaO | 48.2 | 53.2 |
| $SiO_2$ | 18.3 | 16.5 |
| $P_2O_5$ | 0.8 | 1.7 |
| S | 0.09 | 0.15 |

The large heat quantities given in Tables I and II which are supplied to the refining process by the combustion of exhaust gases make it possible to use less pig iron in the original material charge and a much greater portion of cooling ingredients than is possible with conventional top blowing methods.

As noted above, the low reaction temperature in the process according to my invention is achieved by suppressing the direct oxidation by gaseous oxygen of the oxidizable impurties accompanying the molten pig iron charge and conducting the oxidation of said impurities by means of the ferrous oxide (FeO) contained in the refining jet. These oxidation reactions proceed according to the following well-known equilibrium equations:

$$C + FeO \longrightarrow CO + Fe$$
$$Si + 2FeO \longrightarrow SiO_2 + 2Fe$$
$$Mn + FeO \longrightarrow MnO + Fe$$
$$2P + 5FeO \longrightarrow P_2O_5 + 5Fe$$

The oxidation of Si, Mn and P are only slightly exothermic, while the decarbonizing oxidation reaction is highly endothermic. The carbon monoxide (CO) gas which emanates from the melt reacts exothermically in the slag according to the equation $CO + FeO \longrightarrow CO_2 + Fe$. The heat thus liberated additionally heats the slag and, by the conduction, also heats the melt without undesirable sputtering.

In forming ferrous oxide (FeO) and ferric oxide ($Fe_2O_3$) according to the equations $2Fe + O_2 \longrightarrow 2FeO$ and $4Fe + 3O_2 \longrightarrow 2Fe_2O_3$ by means of the refining gas and by direct reduction according to the equation $Fe_2O_3 + Fe \longrightarrow 3FeO$, large heat quantities are produced which heat the melt, and contribute toward balancing the heat absorbed by the decarbonizing reaction.

What I claim is:

1. Method for refining molten metal comprising the steps of
   forming a molten metal bath with a foamed slag cover,
   oxidizing part of the exhaust gases escaping from said bath with cooling additive-containing streams of oxygen-containing refining gas in a confined combustion zone above the bath surface to liberate heat energy and therewith heat said cooling additives,
   discharging jets of said oxygen-containing refining gas beneath the surface of said slag cover but above the surface of said bath in a kinetic flow pattern entraining slag, another part of said exhaust gases, and said cooling additives above the bath surface as a liquid refining jet in which a substantial part of the oxygen reacts to form liquid metal oxides, and
   directing said liquid metal oxide containing refining jet onto and over substantially the entire surface of the bath to refine said metal.

2. Method according to claim 1, wherein the metal is selected from the group consisting of pig iron and mixtures of pig iron and scrap iron.

3. Method according to claim 2, wherein the oxygen-containing refining gas is high purity oxygen.

4. Method according to claim 2 in which the cooling additives are in the form of granules having a diameter which does not exceed 5 millimeters.

5. Method according to claim 2 in which the cooling ingredients are selected from the group consisting of particulate sponge iron or iron ore.

6. Method according to claim 1, wherein the foamed slag is formed by discharging jets of oxygen-containing refining gas toward the surface at an angle of at least 20° from the vertical of the molten metal bath, while entraining impurity binding additives in said jets from above the surface of the melt.

7. Method of refining molten metal which comprises the steps of
   forming a molten bath,
   simultaneously discharging jets of oxygen-containing refining gas over and above the surface of the bath and introducing streams of said refining gas containing particulate impurity binding additives through a confined combustion zone above the bath surface in which said refining gas streams oxidize part of the exhaust gases escaping from said bath to liberate heat energy and therewith heat said impurity binding additives passing through said zone, whereby an entrained jet of foamed slag, exhaust gas and liquid impurity binding additives is formed at the surface of said bath,
   thereafter discharging jets of said refining gas beneath the surface of said foamed slag but above the surface of said bath while simultaneously discharging jets of said refining gas containing particulate cooling additives through said confined combustion zone to heat said cooling additives, the jets being discharged below said foamed slag being discharged in a kinetic flow pattern entraining slag, exhaust gases, and said cooling additives above the bath surface as a liquid refining jet in which a substantial part of the oxygen reacts to form liquid metal oxides, and
   directing said liquid metal oxide containing refining jet onto and over substantially the entire surface of the bath to refine said metal.

8. Method according to claim 7, wherein the refining gas is high purity oxygen.

9. Method according to claim 7, wherein said additives are in the form of granules having a diameter not exceeding 5 millimeters.

10. Method according to claim 7, wherein the metal is selected from the group consisting of pig iron and scrap iron.

11. A method according to claim 10, wherein the impurity binding additive is particulate lime and the cooling additive is selected from the group consisting of particulate sponge iron or iron ore.

References Cited

UNITED STATES PATENTS

| | | | |
|---|---|---|---|
| 3,058,823 | 10/1962 | Churcher | 75—60 |
| 3,356,490 | 12/1967 | Muller et al. | 75—60 |
| 3,565,605 | 2/1971 | Vayssiere | 75—52 X |
| 3,556,773 | 1/1971 | Grenfell | 75—51 |

FOREIGN PATENTS

| | | | |
|---|---|---|---|
| 745,047 | 2/1956 | Great Britain | 75—60 |
| 957,110 | 5/1964 | Great Britain | 75—60 |
| 1,109,420 | 4/1968 | Great Britain | 75—60 |

L. DEWAYNE RUTLEDGE, Primary Examiner

G. K. WHITE, Assistant Examiner

U.S. Cl. X.R.

75—60

UNITED STATES PATENT OFFICE
CERTIFICATE OF CORRECTION

Patent No. 3,684,488      Dated August 29, 1972

Inventor(s) Walter Von Haumeder

It is certified that error appears in the above-identified patent and that said Letters Patent are hereby corrected as shown below:

Column 4, line 9, "doxide" should read --dioxide--.
Column 8, line 14, "convert" should read --converter--.
Column 9, line 36, "0.12% P" should read --0.123% P--.
Column 11, line 23, "0.104" should read --0.014--.

Signed and sealed this 9th day of January 1973.

(SEAL)
Attest:

EDWARD M. FLETCHER, JR.
Attesting Officer

ROBERT GOTTSCHALK
Commissioner of Patents